United States Patent
Douglass, III et al.

(10) Patent No.: US 9,662,826 B2
(45) Date of Patent: May 30, 2017

(54) COILABLE DUAL WALL CORRUGATED PIPE AND RELATED METHOD

(71) Applicant: Prinsco, Inc., Willmar, MN (US)

(72) Inventors: Carl Raymond Douglass, III, Spicer, MN (US); Joseph Dale Larkins, Willmar, MN (US); Timothy R. Toliver, Northfield, OH (US)

(73) Assignee: Prinsco, Inc., Willmar, MN (US)

( * ) Notice: Subject to any disclaimer, the term of this patent is extended or adjusted under 35 U.S.C. 154(b) by 0 days.

(21) Appl. No.: 14/760,678

(22) PCT Filed: Aug. 12, 2014

(86) PCT No.: PCT/US2014/050616
§ 371 (c)(1),
(2) Date: Jul. 13, 2015

(87) PCT Pub. No.: WO2015/023618
PCT Pub. Date: Feb. 19, 2015

(65) Prior Publication Data
US 2016/0018027 A1    Jan. 21, 2016

Related U.S. Application Data

(60) Provisional application No. 61/864,898, filed on Aug. 12, 2013.

(51) Int. Cl.
*F16L 9/18* (2006.01)
*F16L 11/11* (2006.01)
(Continued)

(52) U.S. Cl.
CPC ............ *B29C 47/92* (2013.01); *B29C 47/003* (2013.01); *B29C 47/0004* (2013.01);
(Continued)

(58) Field of Classification Search
CPC .................................. F16L 11/11; F16L 11/15
(Continued)

(56) References Cited

U.S. PATENT DOCUMENTS 3,538,209 A    11/1970    Hegler
3,891,007 A †    6/1975    Kleykamp
(Continued)

FOREIGN PATENT DOCUMENTS

CN    103062519    4/2013
JP    2002257269 A    9/2002
(Continued)

*Primary Examiner* — Patrick F Brinson
(74) *Attorney, Agent, or Firm* — Schroeder & Siegfried, P.A.

(57) ABSTRACT

High flow capacity corrugated coilable dual wall plastic pipe having improved longitudinal flexibility and a bend radius sufficient to permit coiling and plowing of such pipe into the ground using automated installation equipment. The coilable dual wall pipe has an outer corrugated wall formed of a thermoplastic material such as high density polyethylene, and an inner smooth wall formed of a different more flexible and resilient thermo-bondable material that has an enhanced strain capacity and lower modulus of elasticity. The inner wall material also has enhanced mechanical properties which generally improve processing and help prevent excessive drag and tearing of the liner material during the manufacturing process. Suitable material blends for the inner wall incorporating a thermoplastic elastomer additive in combination with a thermoplastic material have proven suitable in providing the required longitudinal flexibility and pipe bend radius to permit the desired pipe coiling and plow installation without failure.

9 Claims, 5 Drawing Sheets

(51) Int. Cl.
*B29C 47/92* (2006.01)
*B29C 47/12* (2006.01)
*F16L 11/15* (2006.01)
*B29C 47/00* (2006.01)
*G01M 5/00* (2006.01)
*F16L 9/12* (2006.01)
*B29K 21/00* (2006.01)
*B29K 105/00* (2006.01)
*B29K 101/12* (2006.01)
*B29L 23/18* (2006.01)

(52) U.S. Cl.
CPC ........ *B29C 47/005* (2013.01); *B29C 47/0035* (2013.01); *B29C 47/126* (2013.01); *F16L 9/12* (2013.01); *F16L 9/18* (2013.01); *F16L 11/15* (2013.01); *G01M 5/0025* (2013.01); *G01M 5/0033* (2013.01); *G01M 5/0075* (2013.01); *G01M 5/0091* (2013.01); *B29K 2021/003* (2013.01); *B29K 2101/12* (2013.01); *B29K 2105/0088* (2013.01); *B29L 2023/186* (2013.01)

(58) Field of Classification Search
USPC ................................................. 138/121, 122
See application file for complete search history.

(56) References Cited

U.S. PATENT DOCUMENTS

| | | | |
|---|---|---|---|
| 3,936,417 A † | 2/1976 | Ronden | |
| 4,303,104 A * | 12/1981 | Hegler | B26F 1/0015 138/121 |
| 4,312,383 A | 1/1982 | Kleykamp | |
| 4,374,227 A | 2/1983 | Michie, Jr. | |
| 4,779,651 A * | 10/1988 | Hegler | F16L 11/118 138/109 |
| 5,071,173 A * | 12/1991 | Hegler | F16L 25/0045 285/399 |
| 5,189,106 A | 2/1993 | Morimoto et al. | |
| 5,338,589 A | 8/1994 | Bohm et al. | |
| 5,803,132 A * | 9/1998 | Lupke | B29C 47/0023 138/121 |
| 5,862,581 A * | 1/1999 | Miller | F16L 21/08 29/237 |
| 5,996,635 A * | 12/1999 | Hegler | B29C 47/0023 138/109 |
| 6,009,912 A | 1/2000 | Andre | |
| 6,186,182 B1 * | 2/2001 | Yoon | F16L 9/06 138/121 |
| 6,199,592 B1 * | 3/2001 | Siferd | B29C 47/0023 138/109 |
| 6,279,614 B1 † | 8/2001 | Riesselmann | |
| 6,399,002 B1 * | 6/2002 | Lupke | F16L 25/0045 138/109 |
| 6,578,608 B2 * | 6/2003 | Hegler | F16L 25/0045 138/109 |
| 6,644,357 B2 * | 11/2003 | Goddard | F16L 11/15 138/121 |
| 6,840,285 B2 * | 1/2005 | Toliver | F16L 11/15 138/121 |
| 7,063,108 B2 * | 6/2006 | Toliver | F16L 11/15 138/121 |
| 7,132,141 B2 † | 11/2006 | Thullen | |
| 7,196,138 B2 | 3/2007 | Starita | |
| 7,484,535 B2 * | 2/2009 | Goddard | B29C 47/0023 138/121 |
| 7,631,668 B2 | 12/2009 | Rantalainen | |
| 7,891,382 B2 | 2/2011 | Rushlander et al. | |
| 8,733,405 B2 * | 5/2014 | Goddard | F16L 9/00 138/121 |
| 8,820,800 B2 * | 9/2014 | Sutton | F16L 25/0054 285/374 |
| 9,267,632 B1 * | 2/2016 | Delmer | F16L 25/0063 |
| 2002/0056482 A1 | 5/2002 | Katayama et al. | |
| 2002/0185188 A1 | 12/2002 | Quigley et al. | |
| 2004/0076783 A1 † | 4/2004 | Norman | |
| 2004/0187946 A1 | 9/2004 | Herrington | |
| 2005/0103392 A1 † | 5/2005 | Cheng | |
| 2011/0241262 A1 | 10/2011 | Siddhamalli et al. | |
| 2011/0247714 A1 † | 10/2011 | Kanao | |

FOREIGN PATENT DOCUMENTS

| | | |
|---|---|---|
| JP | 2003227584 A | 8/2003 |
| JP | 2005233373 A | 9/2005 |
| JP | 2006177496 A | 7/2006 |
| JP | 2007139043 A * | 6/2007 |
| WO | 0233303 A1 † | 4/2002 |
| WO | 2013057734 A1 † | 4/2013 |

\* cited by examiner
† cited by third party

COILABLE DUAL WALL CORRUGATED PIPE AND RELATED METHOD

CROSS REFERENCE TO RELATED APPLICATIONS

This application is an application for a patent which is also disclosed in Provisional Application Ser. No. 61/864,898, filed on Aug. 12, 2013, entitled "Coilable Dual Wall Pipe and Related method," the benefit of the filing date of which is hereby claimed.

FIELD OF INVENTION

The present disclosure relates generally to the field of coilable corrugated plastic drainage pipe, and more particularly to a coilable plastic drainage pipe of dual wall construction having an outer corrugated wall with an inner smooth liner wall formed integrally therewith.

BACKGROUND

The statements in this section merely provide background information related to the present disclosure and may not constitute prior art.

Single wall corrugated high density polyethylene (HDPE) pipe was first developed and has been in existence since the 1970's. Such single wall plastic pipe was first formed in small diameters (e.g., 3" diameter) as a cost effective and productivity enhancing replacement for clay tile used in agricultural applications. Single wall corrugated HDPE pipe allows for significant installation efficiencies due to its flexible nature and the fact that it is available in long and coiled lengths. The longitudinal flexibility and coilable nature of the pipe permits substantially automated plowing of long lengths of the pipe into the ground, as opposed to installing individual sections of pipe through open trench excavation.

However, single wall corrugated pipe does have its drawbacks. For instance, single wall corrugated HDPE is not hydraulically efficient relative to other non-coilable pipe. For gravity flow applications, the interior roughness of pipe is measured by the Mannings coefficient. Single wall corrugated HDPE has a relatively rough interior surface, with a minimum Manning's coefficient falling in the range of 0.021-0.030. Moreover, as technology for installing single wall corrugated HDPE has progressed, so have the number of field failures for corrugated HDPE. The newer installation technology for single wall agriculture applications involves plowing the pipe in the ground. However, with the newer technology, contractors have the tendency to axially stretch the pipe, which results in a reduction in structural properties. The axial stretching of the pipe has led to numerous field failures.

As the corrugated HDPE industry progressed, the diameter ranges of corrugated single wall pipe increased from 3" up to 24", allowing for similar efficient installation practices for larger diameter pipe. Additionally, with further advancements in manufacturing technology, dual wall corrugated HDPE pipe was soon developed. Dual wall pipe has the same corrugated exterior but a smooth wall interior, resulting in dramatic improvements in fluid flow capacity and performance. Dual wall corrugated HDPE has a typical Manning's coefficient falling in the range of 0.010-0.015, which makes it more hydraulically efficient than single wall corrugated HDPE. Additionally, dual wall corrugated HDPE's smooth interior is less likely to get clogged with silts and sands that are in the water being transported in the pipe. Dual wall corrugated HDPE pipe was first introduced into the market on or about in the mid 1980's.

Corrugated dual wall HDPE pipe exhibits many of the same characteristics as single wall HDPE pipe, such as strength and lightweight construction, but also offers significantly increased flow capacity due to the smooth inner wall. Moreover, when tested for axial pipe stiffness in accordance with ASTM Standards (i.e., ASTM F405), the contents of which are incorporated herein by reference, corrugated dual wall pipe has superior strength. Corrugated dual wall HDPE has sufficient axial strength to resist stretching the pipe in an axial direction, thereby preserving its strength when mis-installed by contractors. By contrast, conventional current-day single wall corrugated HDPE pipe does not have sufficient axial strength to keep from being stretched during the installation process.

In addition to the above, with higher axial stiffness, corrugated dual wall HDPE pipe has allowed for the development of a bell and spigot type coupling system. Increased axial stiffness associated with the inner liner has enabled the assembly of a bell and spigot pipe configuration utilizing a compression fit. The compression fit caused by an O-ring style gasket is useful in keeping silts out of the pipe. Such a compression fit typically requires about two lbs. per inch of nominal diameter (2.0 lb/in dia.) axial compression force to engage a bell and spigot coupling system. Corrugated single wall HDPE pipe, on the other hand, utilizes a split coupler that wraps around the outside of the pipe, or an internal snap coupler. This is necessary because the axial stiffness of corrugated single wall pipe is insufficient to permit the compression fit associated with the bell and spigot type coupling system. Both corrugated single wall HDPE pipe joints are considered inferior to the bell and spigot coupling system used with dual wall corrugated HDPE pipe.

The drawback with HDPE dual wall pipe, however, which persists to this day, is the longitudinal stiffness of such pipe caused by the presence of the smooth inner liner wall and general inelasticity of the material; its inability to flex longitudinally prevents many of the installation efficiencies provided by the single wall pipe design. Conventional current-day corrugated HDPE dual wall pipe cannot be coiled or flexed longitudinally without breakage. Consequently, this has required a significant change in installation practice from plowing pipe into the ground to open trench excavations, a practice which is far less efficient and significantly more costly.

Open trench excavation may be appropriate and accepted for certain civil construction applications due to the high expectations for installed performance and the relatively small amount of pipe required to be installed on any single project. For agricultural applications, however, along with flow capacity, installation efficiency is the primary concern. Usually, there are only narrow windows of time between spring thaw and spring planting, and between harvest and ground freezing, during which installation is reasonably practicable, and most projects require installation of thousands and tens of thousands of feet of pipe. Consequently, for agricultural projects, improving installation time and lowering installation cost has a significant impact on the overall project cost. The ability to install pipe via the use of automated plowing equipment is paramount, and the use of pipe having increased axial strength to prevent field failures would also help significantly to increase installation production rates. Because of this installation cost component, there has been a long-felt, strong and unsatisfied need for innovation in the area of high flow capacity corrugated HDPE pipe (i.e., corrugated dual wall pipe) which is flexible enough to be plowed into the ground, has sufficient axial strength to be plowed at higher rates, and is also flexible enough to be coiled.

Finding a solution to the foregoing problems, however, is further complicated by the fact that numerous other variables, such as installation temperatures, processing conditions, pipe diameter, pipe profile geometry, etc., have an effect on and may determine the needs of a particular application. The specific composition of material utilized in the construction of coilable corrugated dual wall pipe for one set of circumstances or application may vary dramatically from that of another. Therefore, the appropriate solution requires suitable versatility to accommodate variations for differing application requirements.

SUMMARY

According to various aspects of the present disclosure, exemplary embodiments are provided herein of an improved high flow capacity corrugated coilable dual wall plastic pipe and processes of manufacturing same. In order to achieve this objective, the material of the inner liner wall requires modification to promote flexibility and resiliency, and facilitate coiling of the pipe and the ability to plow the dual wall pipe into the ground without failure. Accordingly, for typical HDPE dual wall pipe, the inner liner wall needs to be formed of a different HDPE-bondable material having an enhanced strain capacity and reduced modulus of elasticity. Additionally, the liner material should preferably have an enhanced melt strength and relatively low coefficient of friction to help prevent sticking and tearing of the liner material during the manufacturing process.

The use of linear low density polyethylene (LLDPE) as all or part of the inner liner material has been contemplated as one means of lowering the modulus of elasticity and enhancing the flexibility of the inner wall material. The LLDPE material may be used either at 100% loading or be mixed with HDPE at a percentage where the LLDPE is the majority component. However, if LLDPE is used for the inner liner wall, processing alterations may need to be made by increasing the taper of the corrugator cooling mandrel to offset material drag, since LLDPE tends to exhibit a higher coefficient of friction and lower melt strength than HDPE. Moreover, LLDPE is relatively costly to use; therefore, given the challenges faced with production start-up and production consistency, this approach may be less desirable.

As a preferred alternative approach, an appropriate additive may be used to form a blend material for the inner wall that exhibits properties similar to that of LLDPE. Such blended material would be thermally bondable with the outer corrugated wall, but would have enhanced elastomeric properties that provide greater flexibility and resiliency to the pipe in general. One additive contemplated is the use of a thermoplastic elastomer (TPE). TPE has a greater strain capacity and lower modulus of elasticity than HDPE and, in appropriate proportions, can provide the desired enhancement in elastomeric properties of the smooth inner wall. Blend optimization is critical and may vary depending on a number of different factors, including without limitation pipe profile design, manufacturing equipment, processing speed, and/or processing conditions. Additionally, for the final application of the product, a proper balance of flexibility for coiling the pipe and providing sufficient axial strength to prevent the installation related changes to the structural properties of the pipe are necessary in the final optimized blend of materials. Lastly, the TPE blend formulation exhibits the ability to rebound after coiling to form a smoother interior surface, thereby reducing the Mannings coefficient to a value less than 0.021 which is the minimum Mannings coefficient used for corrugated single wall HDPE. Using such a TPE additive has also been found to exhibit other improved mechanical properties that further improves processability of the pipe.

An inner wall inspection system and method is also provided which helps minimize potential disruptions in the extrusion process and alleviate concerns as to the improper formation of the inner wall. The inspection system utilizes automated laser technology that is telescopically received within the dual wall pipe to scan the surface of the inner wall for defects. Multiple cameras function to capture 360° coverage of the inner wall annular surface and report any noted defects to the corrugator operator.

Further areas of applicability will become apparent from the detailed description provided herein. It should be understood that the description and specific examples are intended for purposes of illustration only and are not intended to limit the scope of the present disclosure.

DRAWINGS

These and other objects and advantages of the invention will more fully appear from the following description, made in connection with the accompanying drawings, wherein like reference characters refer to the same or similar parts throughout the several views, and in which.

DETAILED DESCRIPTION

Figure 1:
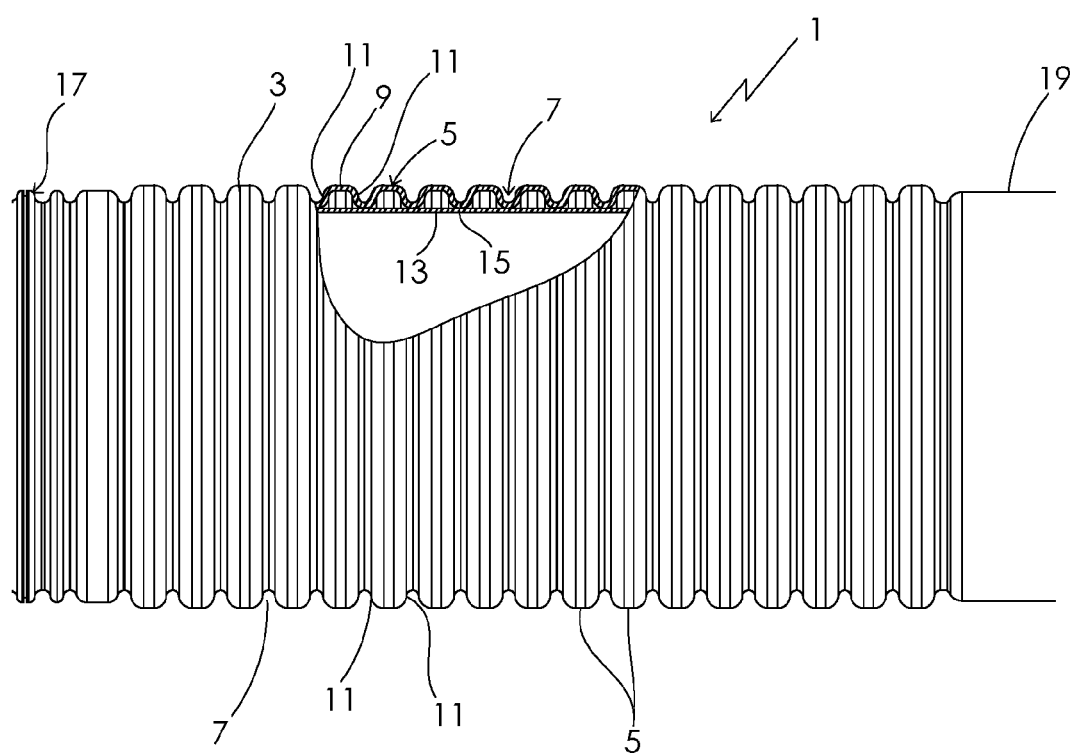
FIG. 1 is a side elevation view of a section of conventional dual wall pipe of bell and spigot design, with a portion thereof broken away to show the dual wall construction of the pipe.

The following description is merely exemplary in nature and is not intended to limit the present disclosure, application, or uses. It should be understood that throughout the drawings, corresponding reference numerals indicate like or corresponding parts and features.

With reference now to the drawings, and particularly to FIG. 1, an exemplary embodiment is shown of a typical section of corrugated dual wall pipe 1 as conventionally constructed. For agricultural purposes, such corrugated dual wall pipe is typically constructed of high density polyethylene (HDPE), but the use of other suitably strong thermoplastic materials, including without limitation polypropylene (PP) and polyvinylchloride (PVC), are also contemplated and considered to be within the scope of the present invention. For convenience, however, the following discussion will focus on pipe formed primarily of HDPE, it being understood that the same principles will apply equally to pipe formed of other thermoplastic materials.

Therefore, as shown in FIG. 1, the section of dual wall pipe 1 has an outer corrugated wall 3 formed of HDPE. The outer corrugated wall 3 is defined by spaced apart successive annular corrugations 5 with annular valley-defining portions 7 deposed therebetween. Each successive corrugation 5 has an outer crest portion 9 with annular sidewalls 11 extending radially inward therefrom. The sidewalls 11 of each corrugation 5 interconnect with and define the adjacent valley-defining portions 7 of the corrugated wall 3. The interior of each section of dual wall pipe 1 is then defined by an inner cylindrical smooth liner wall 13 which is also formed of HDPE. The inner wall 13 is attached to and integrally formed with the root 15 of each of the valley-defining portions 7 of the outer corrugated wall 3 in a manner well known in the art.

The section of dual wall pipe 1 disclosed in FIG. 1 is designed with a conventional bell and spigot coupling system. As shown, one end of pipe 1 constitutes a male spigot 17 and the opposite end comprises an integral female coupling element or bell coupler 19. In a manner also well known in the art, each bell coupler 19 is adapted to receive the spigot end 17 of a similarly constructed section of pipe 1 in end-to-end fashion to form a corrugated piping system of desired length. Due principally to the axial stiffness of such HDPE dual wall pipe, the bell and spigot construction has become the preferred industry standard for installation via methods of open trench excavation.

As noted previously, installation efficiencies are not fully realized with today's corrugated single wall HDPE pipe because of axial stretching associated with higher installation rates. However, there are significant drawbacks to using conventional HDPE dual wall pipe. Particularly in agricultural applications requiring installation of thousands and tens of thousands of feet of pipe, the longitudinal stiffness of such pipe prevents coiling and plowing the pipe into the ground like flexible single walled pipe. Consequently, many of the installation efficiencies provided by corrugated single wall pipe are lost, and conventional HDPE dual wall pipe is limited to piece-by-piece installation using methods of open trench excavation. Installation in this manner is far less efficient and significantly more costly than plowing the pipe into the ground using substantially automated installation equipment.

In light of the foregoing limitations of HDPE corrugated dual wall pipe, producing an improved high flow capacity coilable dual wall pipe which exhibits the longitudinal flexible nature of single wall corrugated plastic pipe and the axial strength similar to dual wall corrugated plastic pipe requires a different approach to the process and product. First, in order to promote field flexibility without failure, the inner liner wall of the pipe must be manufactured with a material other than 100% HDPE. Conventional HDPE and other thermoplastic materials have proven too inflexible to facilitate coiling and plow installation without failure. In order to promote improved overall flexibility and resiliency of the inner liner wall, the liner material should preferably have an enhanced strain capacity and reduced modulus of elasticity. Such flexibility and resiliency is a matter of paramount importance in that the resulting pipe must be capable of achieving significant bending and flexing without cracking, splitting or other failure when coiling the pipe or installing the pipe into the ground using automated plowing equipment. Additionally, the inner wall material must have sufficient strength to allow axial stiffness in tension to resist stretching during high rates of plowing the pipe and sufficient axial stiffness in compression to enable the assembly of bell and spigot joints (i.e., at least approximately 2.0 lb/in nominal diameter). The balance between flexibility to coil the pipe and axial stiffness for high rate installations and bell and spigot assembly makes this invention unique.

While more flexibility and resiliency is critical, other manufacturing parameters must also be achieved. For instance, the inner wall material must have sufficient melt strength to help avoid tearing of the material during the manufacturing process. The material coefficient of friction is also important. It is preferable that the liner material have a relatively low coefficient of friction at the liner melt temperature so as to further prevent sticking of the material to the cooling mandrel and tearing of the liner during the manufacturing process. Moreover, while achieving the above criteria, the liner material must still be suitably compatible for bonding with a thermoplastic material, since it is intended that the outer corrugated wall of the pipe still be formed of HDPE or other thermoplastic material.

As noted above, the liner must be able to bend without tearing and relax to its original shape after bending. Furthermore the liner must be able to provide sufficient axial strength to avoid overstretching during high speed installation processes as well as excessive compression during bell and spigot assembly. Taking all of the above considerations into account, it is contemplated that the resulting corrugated dual wall pipe should have a high degree of longitudinal flexibility such that it is capable of being coiled without damage to a minimum bend radius "R" that is approximately one-half (0.5) the pipe nominal diameter, with a preferred target bend radius falling within the approximate range of 0.5 to 4.0 times the pipe nominal diameter. Moreover, such coilable dual wall pipe should have sufficient axial strength to withstand an axial compressive force of at least about two pounds per inch nominal pipe diameter (2.0 lb/in dia.), which is the axial force typically experienced during assembly of a bell and spigot compression fit coupling system.

Figure 2:
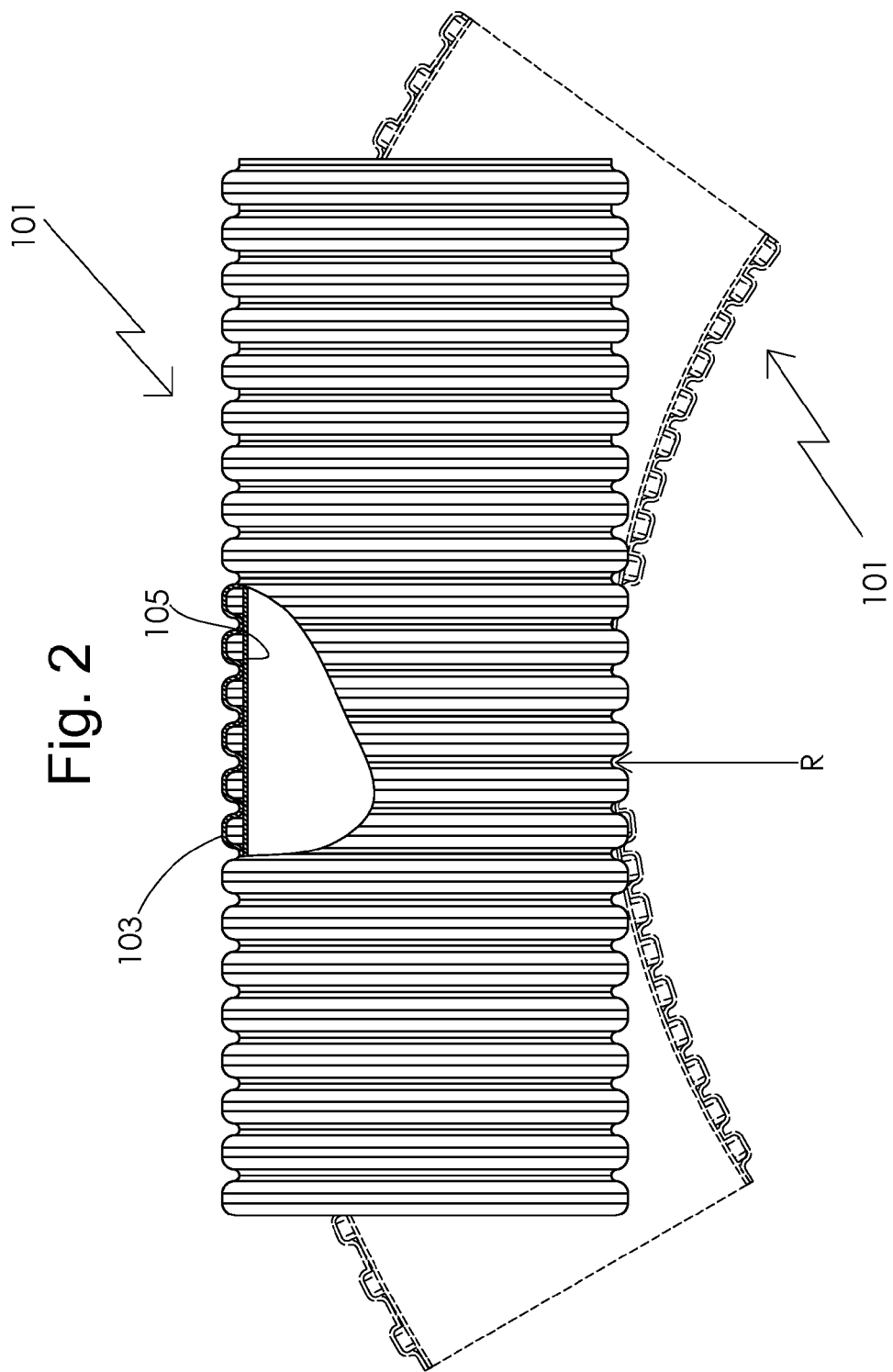
FIG. 2 is a side elevation view of a section of coilable dual wall pipe constructed in accordance with and embodying the principles of the invention described herein, with a portion thereof broken away to show the flexibility and construction of the pipe.
Figure 3:
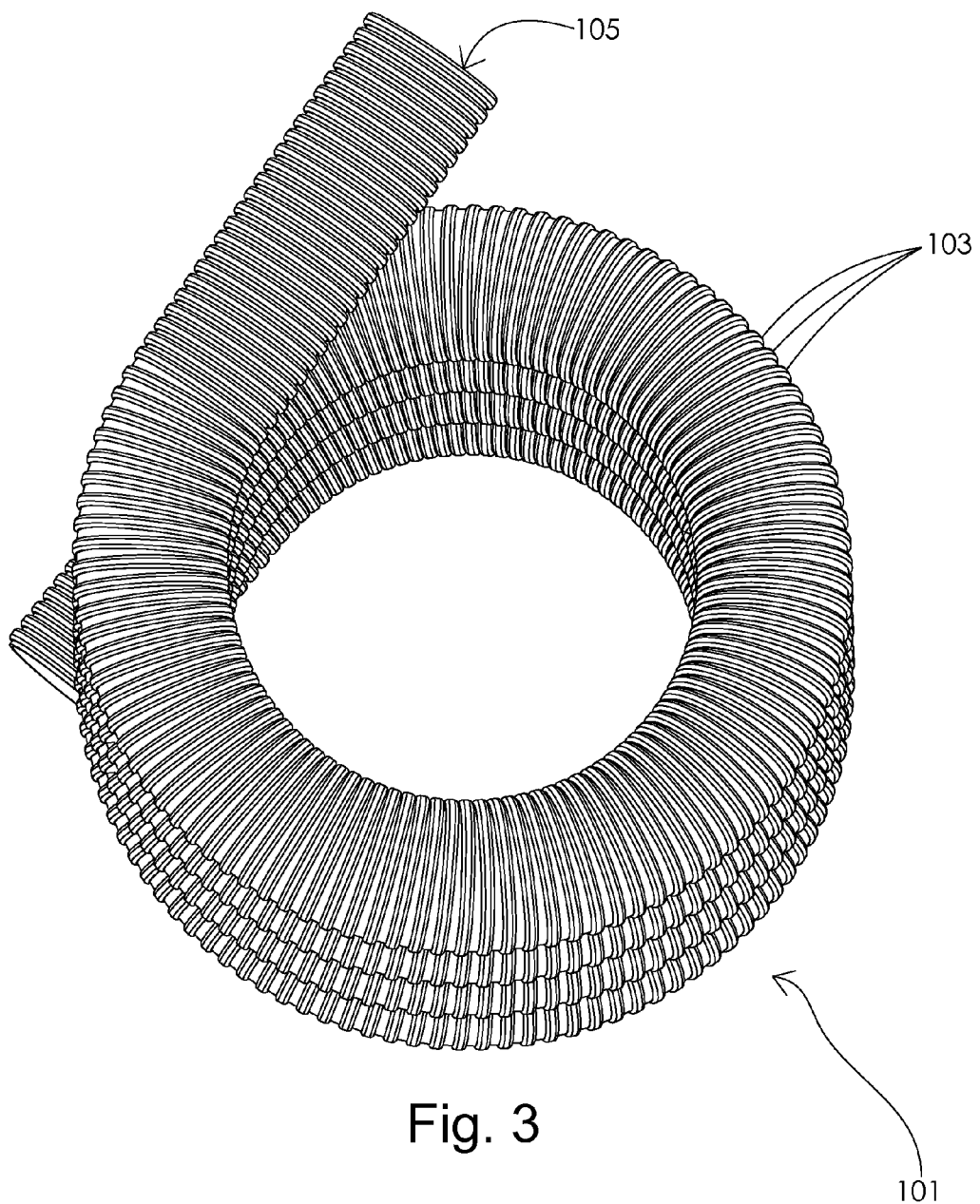
FIG. 3 is a side elevation view of an indeterminate length of coilable dual wall pipe constructed in accordance with and embodying the principles of the invention described herein.

With the above in mind, according to various aspects of the present disclosure, and with specific reference to FIGS. 2 and 3, exemplary embodiments are provided herein of an improved high flow capacity corrugated coilable dual wall plastic pipe 101 and processes of manufacturing same. In one exemplary embodiment, the use of linear low density polyethylene (LLDPE) is contemplated to lower the modulus of elasticity and enhance the flexibility of the liner material. While not intending to be limiting, it has been found that maintaining the short term modulus of elasticity below approximately 80,000 psi (pounds per square inch) has been advantageous in promoting the desired elasticity in the liner material. However, it should be understood that the optimum value or range for the modulus of elasticity of the liner material could vary depending on a number of other factors including, without limitation, the pipe profile design, installation techniques, pipe joint configuration, manufacturing equipment and/or processing conditions/speed.

In order to meet the desired bend radius and axial strength requirements of the resultant coilable dual wall pipe, if LLDPE is used as a component of the liner material, it must be used either at 100% loading or be mixed with HDPE at a percentage where the LLDPE is the majority component.

Here again, although external factors may impact the optimum blend, it has been found that the use of LLDPE in amounts greater than about 60% loading is generally preferred.

Regardless of blend optimization, when LLDPE is used for the liner, there tend to be challenges with production start-up and production consistency. It has been found that the low melt strength of the inner liner wall tends to increase to a level which can potentially create excessive drag on the cooling mandrel during manufacturing. As noted previously, such increased drag is undesirable in that it can cause the pipe liner to tear and/or the pipe corrugator to stop. Therefore, if LLDPE is to be used all or in part as the liner material, it may be necessary to somehow enhance the melt strength properties as the manufactured pipe travels through the pipe corrugator. One means contemplated for dealing with the low melt strength is to properly taper the cooling mandrel of the corrugator. This tends to help reduce the processing issues of the liner therewith while maintaining the necessary contact in order to adequately cool the liner.

LLDPE is a relatively expensive material, however, and due to the heavy loading required for effective results, the use of such material as all or a significant part of the inner liner wall can be costly. Therefore, although the use of LLDPE does provide a workable solution, given the increased cost involved and the challenges faced with production start-up and production consistency, more cost competitive solutions may exist, thus making this approach be less desirable.

As an alternative approach, an appropriate additive may be used with HDPE or other thermoplastic materials to form a bondable blend material for the inner wall that exhibits enhanced elastomeric and mechanical properties. For instance, the use of a thermoplastic elastomer (TPE) is one suitable additive to improve the elastomeric properties of the inner wall and provide greater flexibility and resiliency to the pipe. TPE's are generally low modulus, flexible, thermobondable materials which can be stretched repeatedly to more than twice their original length with the ability to return to nearly the original length. TPEs perform much more like an elastomer, versus the relatively "rigid" behavior of a thermoplastic. Thermoplastics, on the other hand, have a much higher modulus of elasticity and exhibit a much lower tolerance to strain/stretching, i.e., thermoplastics will become permanently deformed at a much lower strain level than TPE's. Where TPE's can tolerate 50% strain with the ability to return to the original shape or up to 200% with minimal permanent deformation, thermoplastics can typically tolerate less than 10% strain without causing permanent deformation. Given the greater strain capacity and lower modulus of elasticity of a TPE, in appropriate proportions, it can provide the desired enhancement to the elastomeric properties of the smooth inner wall.

Vistamaxx® (an Exxon Mobil product) is one such TPE that is contemplated as a potentially viable additive for enhancing the elastomeric properties of the inner wall of a dual wall pipe. Vistamaxx® is a polypropylene based thermoplastic elastomer. It has been found that when Vistamaxx® is mixed in appropriate amounts with HDPE, medium density, low density or linear low density polyethylene, the Vistamaxx® additive allows the finished blend to exhibit similar mechanical properties to LLDPE, thereby producing an improved flexible liner wall with enhanced strain capacity and reduced modulus of elasticity.

In addition to the above, as compared with LLDPE, it has been found that use of certain TPE additives blended with a thermoplastic material have improved mechanical properties which help improve processing of the dual wall pipe during manufacturing, thus avoiding some of the potential pitfalls and/or inconsistencies involved with using LLDPE. For instance, it is believed that the use of certain TPE additives may have the added benefit of enhancing the material blend melt strength of the liner material. Improving the material melt strength helps lessen the tendency for the material to tear when in a molten state during manufacturing, thus further improving processability of the pipe.

Various liner material formulations have been developed using a TPE additive with extremely promising results. The ratio of TPE additive/carrier resin is critical to achieving maximum processing efficiency and field performance. While blend optimization may vary and depend on a number of different factors, it has been found that a blend of less than approximately 40% TPE additive by weight and greater than approximately 60% thermoplastic material exhibits the most promising results. Factors that may have an effect on the optimum blend include, but are not limited to, the pipe profile design, installation practices and temperature, manufacturing equipment, processing speed, and/or processing conditions.

For purposes of illustration, shown in FIGS. 2 and 3 of the drawings is an exemplary embodiment of an improved high flow capacity corrugated coilable dual wall plastic pipe 101 constructed in accordance with the present invention. Such dual wall pipe 101 is characterized in having an outer corrugated wall 103 formed of HDPE or other suitable thermoplastic material, and a smooth cylindrical inner liner wall 105 formed of a different material meeting the parameters of the embodiments discussed above. As shown by the dashed representation of the coilable dual wall pipe 101 in FIG. 2, with the increased elasticity and strain capacity of inner wall 105, pipe 101 exhibits substantially improved longitudinal flexibility, and is capable of being bent and coiled for ease of transportation and automated installation. FIG. 2 also shows the inner wall 105 of the pipe 101, which is essentially smooth. This inner wall 105 improves the hydraulic characteristics of the pipe 101. Other than the enhanced flexibility and resiliency of the corrugated dual wall pipe 101, in most other respects such pipe is constructed similar to the conventional pipe 1, shown in FIG. 1. Notably, however, as best depicted in FIG. 3, the longitudinally flexible coilable dual wall pipe 101 may be produced in long indeterminate lengths, as opposed to numerous individual sections of conventional dual wall pipe 1, each section of which requires some form of coupling system (e.g., bell & spigot) for joining the same end-to-end.

More importantly, the inner liner wall 105 of dual wall pipe 101 has been produced with an enhanced strain capacity and modulus of elasticity which promotes sufficient flexibility and resiliency to facilitate bending of the pipe 101 to a minimum bend radius "R" that is approximately one-half (0.5) the pipe nominal diameter, with a preferred target bend radius falling within the approximate range of 0.5 to 4.0 times the pipe nominal diameter. With such enhanced longitudinal flexibility, as shown in FIGS. 2 and 3, coiling of the improved dual wall pipe 101 is now possible, and installation by plowing the pipe into the ground in a manner similar to single wall corrugated pipe is now available.

Furthermore, the pipe 101 with the inner wall 105 has improved axial strength to allow plowing at increased rates. When tested in accordance with the applicable ASTM Standard F405, the axial pipe stiffness of the coilable dual wall pipe 101 is greater than that of conventional single wall corrugated HDPE pipe. From a manufacturing standpoint, there are virtually no required modifications other than to account for the possibility of slightly increased processing friction caused by the modified liner material. Accordingly, an improved high flow capacity coilable dual wall corrugated pipe having all the installation efficiencies equal to or great than conventional single wall corrugated plastic pipe is now available.

The manufacturing process for dual wall pipe generally involves the use of a co-extrusion process where extrusion dies are fed polymer melt from an extruder or plurality of extruders. The extrusion dies form the polymer melt into inner and outer polymer melt parisons. The outer melt parison exits one extrusion die orifice into a series of vacuum mold blocks run on a continuous corrugator, where the parison is thermoformed to create the outer corrugated wall. The inner melt parison exits another extrusion die orifice and typically passes over a cooling and sizing mandrel, where it becomes thermo-bonded to the valley portions of the corrugated outer wall, thereby forming the smooth inner wall of the dual wall corrugated plastic pipe.

Thermoplastic poly-olefins such as high density polyethylene, polypropylene, polyvinylchloride and blends or mixtures thereof may be utilized to manufacture dual wall corrugated plastic pipe. Even when the polymer melts for each wall is consistent in material composition, variations between material lots and extrusion processing can present difficulties in maintaining uniformity of wall thickness and linear weight of the dual wall plastic pipe. Variations in viscosity and elasticity can cause the extruded pipe walls to experience stress cracking and other dimensional product variations. Nevertheless, with proper controls in place, processing efficiency and consistency in the output of the corrugator can typically be maintained.

However, altering the material make-up of the polymer melt for the inner liner wall (e.g., by introducing an additive to the polymer melt to produce a blended material having enhanced elastomeric properties) can significantly affect the processing start-up and output efficiency of the corrugator. LLDPE tends to have a lower melt strength, thus requiring adjustments in the extrusion process. With LLDPE, it may be necessary to properly taper the corrugator cooling mandrel to offset material melt strength issues. TPEs, on the other hand, have mechanical properties that generally prove to be more workable as an additive to the inner wall material and tend to improve the processing of coilable dual wall pipe during the manufacturing process. Nevertheless, the use of such additives will change the material composition of the inner wall, and can and will inevitably lead to variations in the extrusion process, thus possibly affecting the processing start-up and output efficiency of the corrugator.

Figure 4:
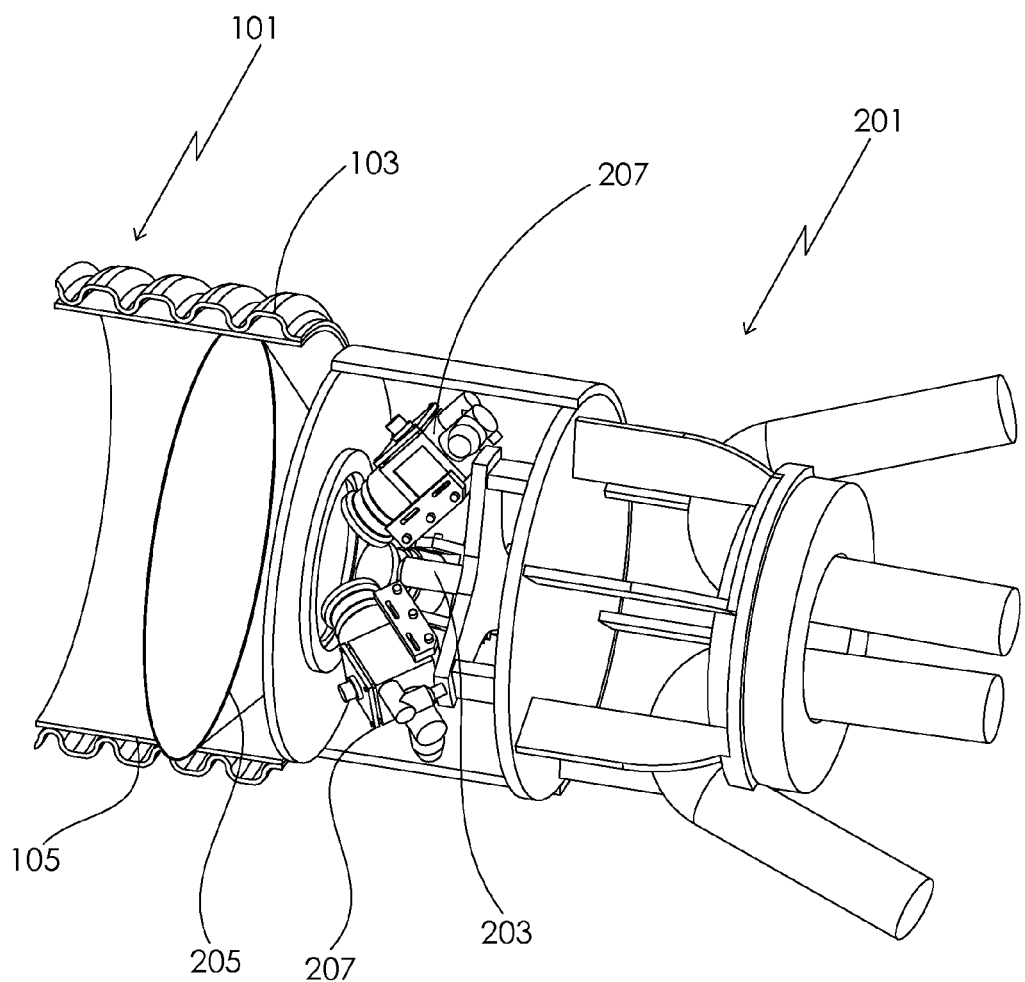
FIG. 4 is a diagrammatic side elevation showing the manner of use of a three dimensional laser imager for inspecting the integrity of the inner wall of a section of coilable dual wall pipe.

In order to minimize potential disruptions in the extrusion process and alleviate concerns as to the improper formation of the inner wall of extruded corrugated dual wall pipe, an inner wall inspection system and method has been developed which utilizes automated laser technology to scan the surface of the inner wall for defects. With reference to FIG. 4, it can be seen that, as the improved coilable dual wall pipe 101 with the enhanced flexible inner wall 105 exits the corrugator (not shown), it telescopes over a three-dimensional (3-D) laser imager 201. The laser imager 201 scans the entire annular surface of the inner wall 105 of the dual wall pipe 101 for defects as it is being processed and reports any noted defects to the corrugator operator.

The laser imager 201 must be capable of scanning 360° within the pipe. Since a standard laser line pattern generator is only capable of emitting light as a 2-dimensional triangular wedge, it would require alignment of multiple lasers for 360° coverage, making it virtually impossible to maintain precise alignment. Therefore, in order to inspect the entire inner annular surface 105 of the dual wall pipe 101, imager 201 utilizes a conical laser pattern generator 203. As shown in FIG. 4, the 3-dimensional, conical shape 205 of the beam generator 203 casts a thin circle against the inner wall 105 of the dual wall pipe 101, allowing for complete coverage of the interior pipe surface, without requiring alignment of multiple generators.

For purposes of recording inspection results, the imager 201 incorporates a three (3) camera configuration, with each camera 207 spaced at 120° intervals, allowing for 40° overlap at the image edges. Each camera 207 is pitched 45° down, relative to the laser cone and pipe direction of travel. This places the center of the camera sensor in alignment with one of the three segments of the laser cone against the inner wall 105 of the dual wall pipe 101. With this camera configuration, comprehensive 3-D coverage of the inner wall 105 may be recorded and analyzed for manufacturing defects as the dual wall pipe 101 is being manufactured, thus ensuring structural integrity of the manufactured pipe.

Figure 5:
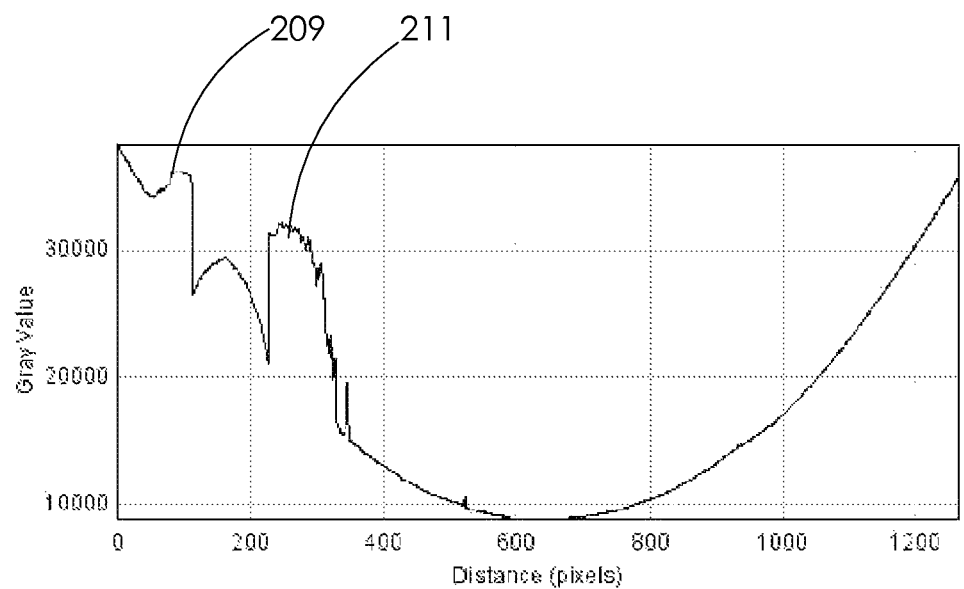
FIG. 5 is a graphical representation of a recorded output from one of the laser imager cameras, showing a display of the inner wall of a dual wall pipe having defects.
Figure 6:
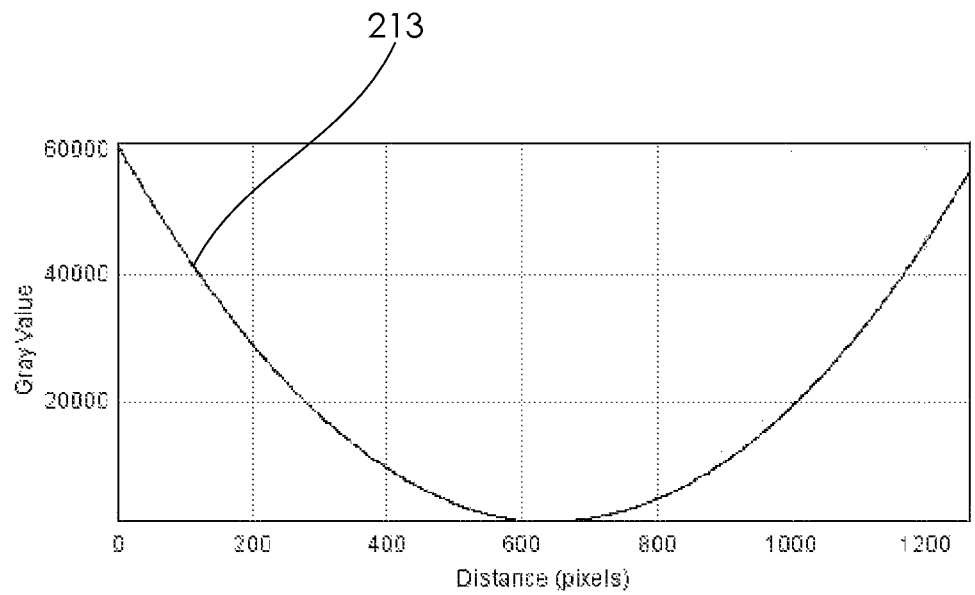
FIG. 6 is a graphical representation of a recorded output from one of the laser imager cameras, showing a display of the inner wall of a dual wall pipe having no defects.

With reference to FIGS. 5 & 6, recorded comparative imagery results from an inner wall liner 105 with and without defects is shown graphically. Each graph represents a 2D height map and cross section profile of an inner liner wall 105 taken from a single camera 207, using the conical laser projection 205. FIG. 5 shows notable defects in the inner wall surface at points 209 and 211. By contrast, the constant curve 213 shown in FIG. 6 represents a smooth inner liner wall with no surface defects. Each camera 207 records a 120° minimum section of the interior of the dual wall pipe 101, ensuring complete recorded coverage. With the forgoing inspection system and method, quality control as to the structural integrity of the inner wall 105 of the coilable dual wall pipe 101 is assured.

The disclosure herein is intended to be merely exemplary in nature and, thus, variations that do not depart from the gist of the disclosure are intended to be within the scope of the disclosure. Such variations are not to be regarded as a departure from the spirit and scope of the invention herein, which comprises the matter shown and described herein and set forth in the appended claims.

The invention claimed is:
1. Coilable dual wall corrugated plastic pipe, comprising:
   (a) an elongated section of hollow, generally cylindrical plastic pipe with a longitudinal axis, said pipe having an inner wall with a cylindrical substantially smooth inner surface and having a generally cylindrical corrugated outer wall with spaced apart successive annular peaks and annular valley defining portions therebetween, said inner wall being connected to said corrugated outer wall at said annular valley defining portions thereof;
   (b) said outer corrugated wall being composed primarily of high density polyethylene;
   (c) said inner wall being formed of a material blend composed of high density polyethylene and a thermoplastic elastomer; and
   (d) said material blend of said inner wall having a greater strain capacity and lower modulus of elasticity than said material of said corrugated outer wall, so as to provide sufficient flexibility and resiliency to facilitate bending and coiling of said pipe during transport and installation.
2. The coilable dual wall pipe set forth in claim 1, wherein said material blend of said inner wall is sufficiently flexible and resilient to facilitate bending of said pipe without damage to a minimum bend radius which is approximately one-half the pipe nominal diameter.

3. The coilable dual wall pipe set forth in claim 2, wherein said bend radius of said pipe falls within a target range of approximately 0.5 to 4.0 times the pipe nominal diameter.

4. The coilable dual wall pipe set forth in claim 1, wherein said material blend of said inner wall is composed of less than about 40% thermoplastic elastomer by weight.

5. The coilable dual wall pipe set forth in claim 1, wherein said material blend of said inner wall has a short term modulus of elasticity below approximately 80,000 psi.

6. The coilable dual wall pipe set forth in claim 1, wherein said inner wall forms a substantially smooth inner surface having a mannings coefficient less than 0.021.

7. The coilable dual wall pipe set forth in claim 1, wherein said inner wall increases the axial strength of said pipe in tension to an amount greater than corrugated single wall high density polyethylene pipe of similar diameter.

8. The coilable dual wall pipe set forth in claim 1, wherein said inner wall increases the axial strength in compression to an amount sufficient to assemble a bell and spigot compression joint.

9. The coilable dual wall pipe set forth in claim 1, wherein said material blend from which said inner wall is formed has enhanced mechanical properties relative to linear low density polyethylene that facilitate improved processing of said pipe during manufacturing.

* * * * *